(12) United States Patent
Shin et al.

(10) Patent No.: US 8,400,596 B2
(45) Date of Patent: Mar. 19, 2013

(54) VERTICALLY ALIGNED LIQUID CRYSTAL DISPLAY AND MANUFACTURING METHOD OF THE SAME

(75) Inventors: Kyoung-Ju Shin, Hwaseong-si (KR);
Jun-Hyung Souk, Yongin-si (KR);
Chong-Chul Chai, Seoul (KR);
Mee-Hye Jung, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 521 days.

(21) Appl. No.: 12/254,426

(22) Filed: Oct. 20, 2008

(65) Prior Publication Data
US 2009/0207359 A1    Aug. 20, 2009

(30) Foreign Application Priority Data
Feb. 15, 2008    (KR) .................... 10-2008-0014173

(51) Int. Cl.
*G02F 1/1337*    (2006.01)
(52) U.S. Cl. ..................................... 349/129
(58) Field of Classification Search ........... 349/128–129
See application file for complete search history.

(56) References Cited

U.S. PATENT DOCUMENTS

| | | | |
|---|---|---|---|
| 5,909,265 A | 6/1999 | Kim et al. | |
| 7,084,947 B2 | 8/2006 | Miyachi | |
| 7,564,524 B2 * | 7/2009 | Maeda | 349/129 |
| 2003/0020214 A1 | 1/2003 | Poor | |
| 2003/0174269 A1 * | 9/2003 | Tanaka et al. | 349/129 |
| 2003/0202144 A1 * | 10/2003 | Kim et al. | 349/129 |
| 2004/0188653 A1 | 9/2004 | Kataoka | |
| 2005/0237463 A1 | 10/2005 | Kubo | |
| 2007/0085955 A1 * | 4/2007 | Kimura | 349/129 |

FOREIGN PATENT DOCUMENTS

| | | |
|---|---|---|
| JP | 2000-321578 | 11/2000 |
| JP | 2001-215516 | 8/2001 |
| JP | 2001-337329 | 12/2001 |
| JP | 2005-221818 | 8/2005 |
| JP | 2006-309271 | 11/2006 |
| KR | 1998-064353 | 10/1998 |
| KR | 1999-031144 | 5/1999 |
| KR | 10-2002-0036309 | 5/2002 |
| KR | 10-2007-0007604 | 1/2007 |
| KR | 10-2007-0008290 | 1/2007 |

\* cited by examiner

*Primary Examiner* — Eric Wong
(74) *Attorney, Agent, or Firm* — H.C. Park & Associates, PLC

(57) ABSTRACT

A liquid crystal display includes a first signal line disposed on a first substrate, a second signal line disposed on the first substrate and crossing the first signal line, a switching element disposed on the first substrate and connected to the first signal line and the second signal line, a first slope member disposed on the switching element and forming a ridge, a valley, and an inclined surface between the valley and the ridge, a pixel electrode disposed on the first slope member and connected to the switching element, a first alignment layer disposed on the pixel electrode and vertically aligned with respect to the surface of the first substrate, a second substrate facing the first substrate, a common electrode disposed on the second substrate, and a liquid crystal layer disposed between the first alignment layer and the common electrode.

24 Claims, 8 Drawing Sheets

VERTICALLY ALIGNED LIQUID CRYSTAL DISPLAY AND MANUFACTURING METHOD OF THE SAME

CROSS-REFERENCE TO RELATED APPLICATION

This application claims priority from and the benefit of Korean Patent Application No. 10-2008-0014173, filed on Feb. 15, 2008, which is hereby incorporated by reference for all purposes as if fully set forth herein.

BACKGROUND OF THE INVENTION

1. Field of the Invention

The present invention relates to a vertically aligned liquid crystal display and a manufacturing method thereof.

2. Discussion of the Background

Liquid crystal displays (LCDs) are one of the most widely used types of flat panel displays. An LCD has two display panels on which field generating electrodes, such as pixel electrodes and a common electrode, are disposed, and a liquid crystal (LC) layer disposed between the display panels. The LCD also includes a plurality of thin film transistors connected to the pixel electrodes, and a plurality of signal lines, such as data lines and gate lines, to apply voltages to the pixel electrodes by controlling the switching elements.

Among LCDs, a vertical alignment (VA) mode LCD, in which LC molecules are aligned such that their long axes are perpendicular to the panels in the absence of an electric field, is spotlighted because of its high contrast ratio and wide viewing angle.

In the VA mode LCD, the wide viewing angle may be realized by aligning an alignment layer through light irradiation so that the LC molecules have a pre-tilt angle.

To realize the wide viewing angle, the LC molecules should have pre-tilt angles in at least four directions such that the alignment layer is divided into four regions, and each region is irradiated. The light irradiation for each region is controlled with a shadow mask so that light is irradiated onto only a desired portion. However, the number of shadow masks and light irradiation processes increases as the number of regions increases, thereby complicating the manufacturing process.

Furthermore, because the LC molecules are pre-tilted relative to the surface of the substrate, light leakage may be generated in a black state of a normally black mode LCD such that the contrast ratio may be deteriorated.

SUMMARY OF THE INVENTION

The present invention provides a method of manufacturing an LCD in which the number of light irradiation processes for forming the pre-tilt angle of the LC molecules may be minimized.

The present invention also provides an LCD that may have an improved contrast ratio.

Additional features of the invention will be set forth in the description which follows, and in part will be apparent from the description, or may be learned by practice of the invention.

The present invention discloses an LCD including a first substrate, a first signal line disposed on the first substrate, a second signal line disposed on the first substrate and crossing the first signal line, a switching element disposed on the first substrate and connected to the first signal line and the second signal line, a first slope member disposed on the switching element and including a ridge, a valley, and an inclined surface between the ridge and the valley, a pixel electrode disposed on the first slope member and connected to the switching element, a first alignment layer disposed on the pixel electrode and vertically aligned with respect to the surface of the first substrate, a second substrate facing the first substrate, a common electrode disposed on the second substrate, and a liquid crystal layer disposed between the first alignment layer and the common electrode.

The present invention also discloses a method for manufacturing an LCD including forming a first display panel including a first substrate, a first slope member including a valley, a ridge, and an inclined surface between the valley and the ridge, a pixel electrode disposed on the first slope member, and a first alignment layer disposed on the pixel electrode. The method further includes forming a second display panel including a second substrate, a common electrode, and a second alignment layer disposed on the common electrode, performing light irradiation to align the first alignment layer in the vertical direction with respect to the surface of the first substrate, performing light irradiation to align the second alignment layer in a vertical direction with respect to the surface of the second substrate, and combining the first display panel with the second display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
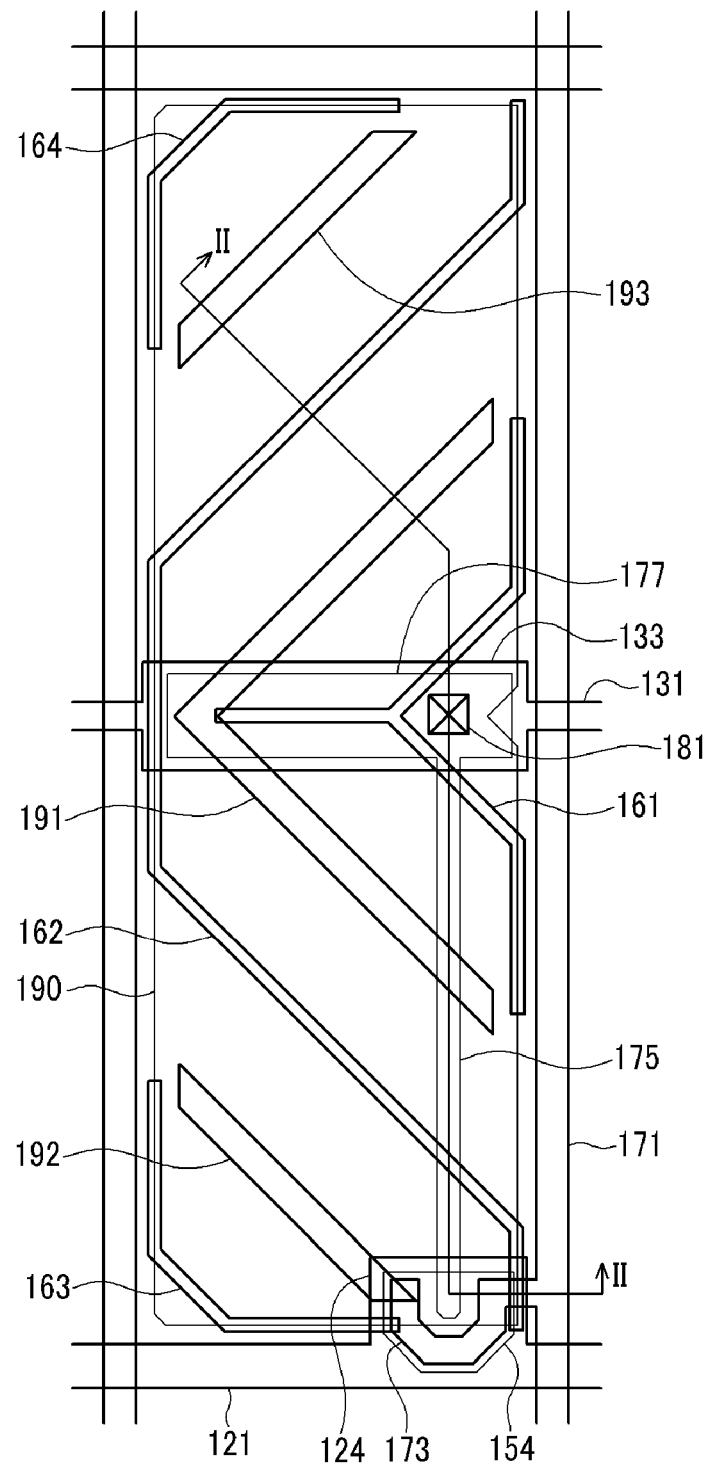
FIG. 1 is a layout view of an LCD according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
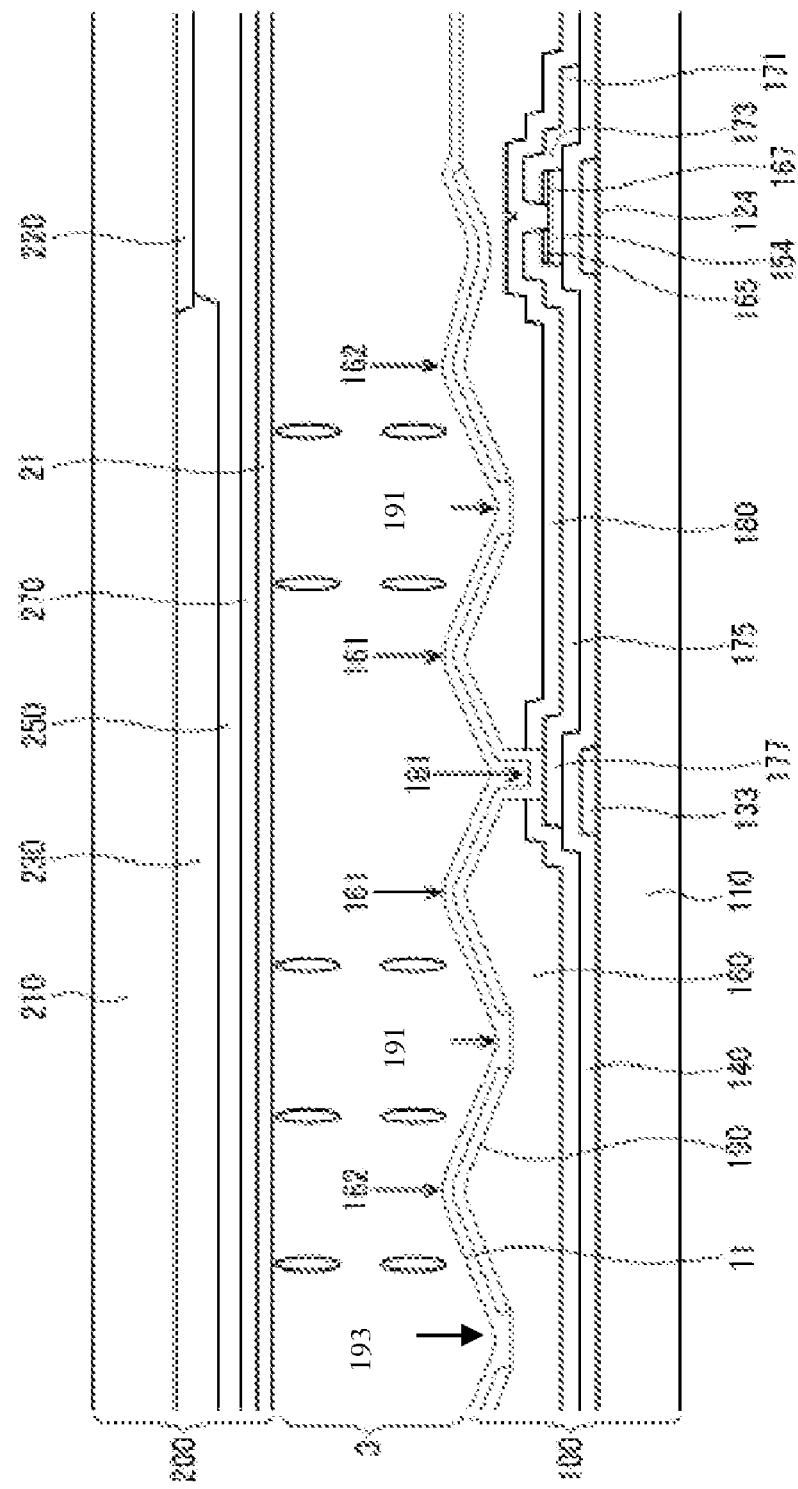
FIG. 2 is a cross-sectional view taken along line II-II of FIG. 1.

FIG. 1 is a layout view of an LCD according to an exemplary embodiment of the present invention, and FIG. 2 is a cross-sectional view taken along line II-II of FIG. 1.

Referring to FIG. 1 and FIG. 2, an LCD according to an exemplary embodiment of the present invention includes a thin film transistor array panel 100 and a common electrode panel 200 that face each other, and a liquid crystal layer 3 between the two display panels 100 and 200.

Firstly, the thin film transistor array panel 100 will be described with reference to FIG. 1 and FIG. 2.

A plurality of gate lines 121 and a plurality of storage electrode lines 131 are disposed on an insulating substrate 110, which may be made of a material such as transparent glass or plastic.

The gate lines 121 extend substantially in a transverse direction and transmit gate signals. Each gate line 121 includes a plurality gate electrodes 124 that protrude upward.

The storage electrode lines 131 are supplied with a predetermined voltage and extend substantially parallel to the gate lines 121. Each storage electrode line 131 is disposed at the halfway point between two adjacent gate lines 121. The storage electrode lines 131 include a plurality of storage electrodes 133 extending upward and downward.

A gate insulating layer 140, which may be made of silicon nitride ($SiN_x$) or silicon oxide ($SiO_x$), is disposed on the gate lines 121 and the storage electrode lines 131.

A plurality of semiconductor islands 154, which may be made of hydrogenated amorphous silicon (abbreviated to "a-Si") or polysilicon, are disposed on the gate insulating layer 140. The semiconductor islands 154 are disposed on the gate electrodes 124.

A plurality of pairs of ohmic contact islands 165 and 167 are disposed on the semiconductor islands 154. The ohmic contact islands 165 and 167 may be made of n+ hydrogenated a-Si heavily doped with an n-type impurity such as phosphorous, or they may be made of silicide.

A plurality of data lines 171 and a plurality of drain electrodes 175 are disposed on the ohmic contacts 165 and 167 and the gate insulating layer 140.

The data lines 171 transmit data voltages and extend substantially in the longitudinal direction and cross the gate lines 121 and the storage electrode lines 131. Each data line 171 includes a plurality of source electrodes 173 projecting toward the gate electrodes 124 and curved like a "U".

The drain electrodes 175 are spaced apart from the data lines 171 and are opposite to the source electrodes 173 with respect to the gate electrodes 124.

Each drain electrode 175 includes a wide end portion 177 having a large area, and another end portion with a bar shape. The wide end portions 177 overlap the storage electrodes 133 and the bar-shaped end portions are partly enclosed by the source electrodes 173.

A gate electrode 124, a source electrode 173, and a drain electrode 175 along with a semiconductor island 154 form a TFT having a channel formed in the semiconductor island 154 between the source electrode 173 and the drain electrode 175.

A passivation layer 180 is disposed on the data lines 171, the drain electrodes 175, and the exposed semiconductor islands 154. The passivation layer 180 may be omitted if necessary.

A plurality of slope members 160 forming ridges 161, 162, 163, and 164 and valleys are disposed on the passivation layer 180. The slope members 160 may be made of an organic layer.

The slope members 160 and the passivation layer 180 have a plurality of contact holes 181 exposing the wide end portions 177 of the drain electrodes 175.

A plurality of pixel electrodes 190 is disposed on the slope members 160. The pixel electrodes 190 may be made of a transparent conductor such as ITO or IZO, or a reflective conductor such as Ag, Al, chromium, or alloys thereof. The pixel electrodes 190 are connected to the wide end portions 177 of the drain electrodes 175 through the contact holes 181, and include a plurality of cutouts 191, 192, and 193.

The valleys and the ridges 161, 162, 163, 164 formed by the slope members 160 will be described in detail below.

The first ridge 161 includes a stem parallel to the gate lines 121 and overlapping the storage electrodes 133, upper and lower oblique portions extending upward and downward in oblique directions from the stem, an upper branch extending upward from the upper oblique portion, parallel to the data line 171, and approximately overlapping the right edge of the pixel electrode 190, and a lower branch extending downward from the lower oblique portion, parallel to the data line 171, and overlapping the right edge of the pixel electrode 190.

The second ridge 162 includes a central portion crossing the storage electrode 133 and overlapping the left edge of the pixel electrode 190, upper and lower oblique portions extending upward and downward, respectively, in oblique directions from the central portion, an upper branch extending upward from the upper oblique portion, parallel to the data line 171, and overlapping the right edge of the pixel electrode 190, and a lower branch extending downward from the lower oblique portion, parallel to the data line 171, and overlapping the right edge of the pixel electrode 190.

The third ridge 163 includes an oblique portion disposed on the left lower corner of the pixel electrode 190 and extending in the oblique direction, a longitudinal branch extending upward from the oblique portion, parallel to the data line 171, and overlapping the left edge of the pixel electrode 190, and a transverse branch extending to the right from the oblique portion, parallel to the gate line 121, and overlapping the lower edge of the pixel electrode 190.

The fourth ridge 164 includes an oblique portion disposed on the left upper corner of the pixel electrode 190 and extending in the oblique direction, a longitudinal branch extending downward from the oblique portion, parallel to the data line 171, and overlapping the left edge of the pixel electrode 190, and a transverse branch extending to the right from the oblique portion, parallel to the gate line 121, and overlapping the upper edge of the pixel electrode 190.

The valleys are disposed between the ridges 161, 162, 163, and 164. That is to say, a valley is disposed between each of the first ridge 161 and the second ridge 162, the second ridge 162 and the third ridge 163, and the second ridge 162 and the fourth ridge 164. The cutouts 191, 192, and 193 of the pixel electrodes 190 are disposed in the valleys. The first cutout 191 is disposed between the first ridge 161 and the second ridge 162 and may have a "V" shape that is laid in the side direction, and the second and third cutouts 192 and 193, which are respectively disposed between the second ridge 162 and the third ridge 163, and the second ridge 162 and the fourth ridge 164, may each have a bar shape that extends in the oblique direction.

Inclined surfaces are formed between the ridges 161, 162, 163 and 164, and the valleys. The slope angle of the inclined surfaces with respect to the substrate 110 may be about 0.5° to 5°. If the angle is less than 0.5°, a pre-tilt angle of the LC molecules may not be generated, and if the angle is more than 5°, the inclined surface may become sharp, such that may become difficult to perpendicularly align the LC molecules with respect to the substrate 110 through light alignment.

A lower alignment layer 11 is disposed on the pixel electrodes 190. The lower alignment layer 11 is vertically aligned with the substrate 110 through light irradiation, for example, with ultraviolet rays. Accordingly, the LC molecules contacting the lower alignment layer 11 are perpendicularly arranged with respect to the substrate 110.

Next, a common electrode panel 200 will be described with the reference to FIG. 1 and FIG. 2.

A light blocking member 220, which may be a single layer or a double layer that includes chromium and chromium oxide or an organic material, is disposed on an insulation substrate 210 that may be made of transparent glass or plastic, and color filters 230 are disposed on the light blocking member 220. The light blocking member 220 may have a plurality of openings arranged with a matrix shape, and the color filters 230 may include red, green, and blue color filters, or red, green, blue, and white color filters, and fill the openings of the light blocking member 220.

An overcoat 250, which may be made of a transparent organic insulating material, is disposed on the light blocking member 220 and the color filters 230, and a common electrode 270, which may be made of a transparent conductive material such as ITO or IZO, is disposed on the overcoat 250. The overcoat 250 may be omitted.

An upper alignment layer 21 is disposed on the common electrode 270. The upper alignment layer 21 is vertically aligned with respect to the substrate 210 through light irradiation, for example, with ultraviolet rays. Accordingly, the LC molecules contacting the upper alignment layer 21 are perpendicularly arranged with respect to the substrate 210.

The LC layer 3 includes LC molecules having negative dielectric anisotropy such that the LC molecules are initially arranged perpendicular to the substrates 110 and 210 by the lower and the upper alignment layers 11 and 21.

Now, the light alignment performed during the manufacture of the liquid crystal display shown in FIG. 1 and FIG. 2 will be described with reference to FIG. 3 and FIG. 4.

Figure 3:
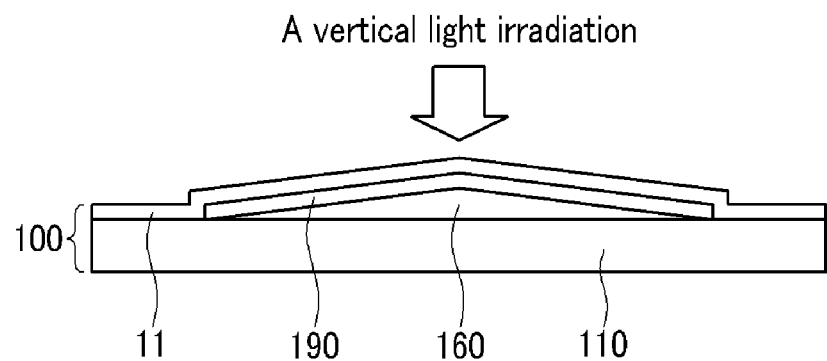
FIG. 3 and FIG. 4 show steps of irradiating light for light alignment to manufacture the liquid crystal display of FIG. 1 and FIG. 2.
Figure 4:
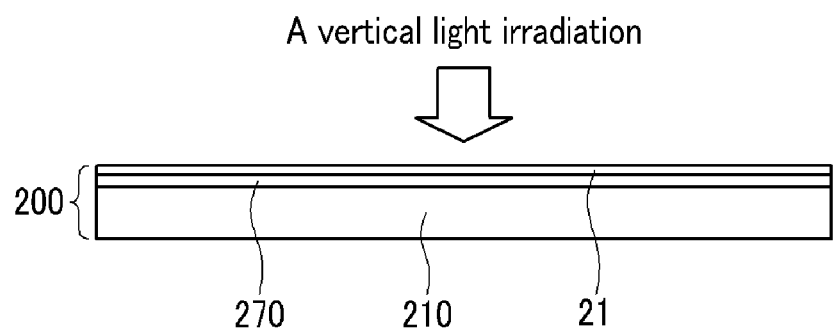

FIG. 3 shows a process of aligning the lower alignment layer 11 through light irradiation, and FIG. 4 shows a process for aligning the upper alignment layer 21 through light irradiation.

As shown in FIG. 3 and FIG. 4, the lower alignment layer 11 and the upper alignment layer 21 are initially aligned through light irradiation, for example, using ultraviolet rays, during which light is vertically irradiated to the surfaces of the two substrates 110 and 210. Here, the light irradiation may be performed by scanning with a beam having a linear cross-section.

Light is vertically irradiated onto the surface of the substrates 110 and 210 so that the alignment layers 11 and 21 cause the LC molecules to be aligned perpendicular to the surface of the substrates 110 and 210. Here, the two alignment layers 11 and 21 are respectively aligned through a single light irradiation process, thereby simplifying the light alignment process. Also, it may not be necessary to partially cover the alignment layers 11 and 21 during light irradiation so a shadow mask may not be required, thereby reducing the manufacturing cost.

Next, when light alignment of the lower alignment layer 11 and the upper alignment layer 21 is completed, the two display panels 100 and 200 are combined and the LC molecules are injected therebetween. The LC molecules may be injected using a pressure difference after the two display panels 100 and 200 are combined with a sealant, or by forming the sealant on the periphery of one of the two display panels 100 or 200, depositing the LC molecules therein, and combining the other panel 200 or 100 thereto.

In this way, the slope member 160 is formed and the LC molecules are initially aligned perpendicularly with respect to the substrate 110 and 210 such that the luminance may be largely reduced in a black state, and the pre-tilt angle is provided to the LC molecules such that the LC molecules may be inclined to form a plurality of LC domains. This will be described in more detail with reference to FIG. 5.

Figure 5:
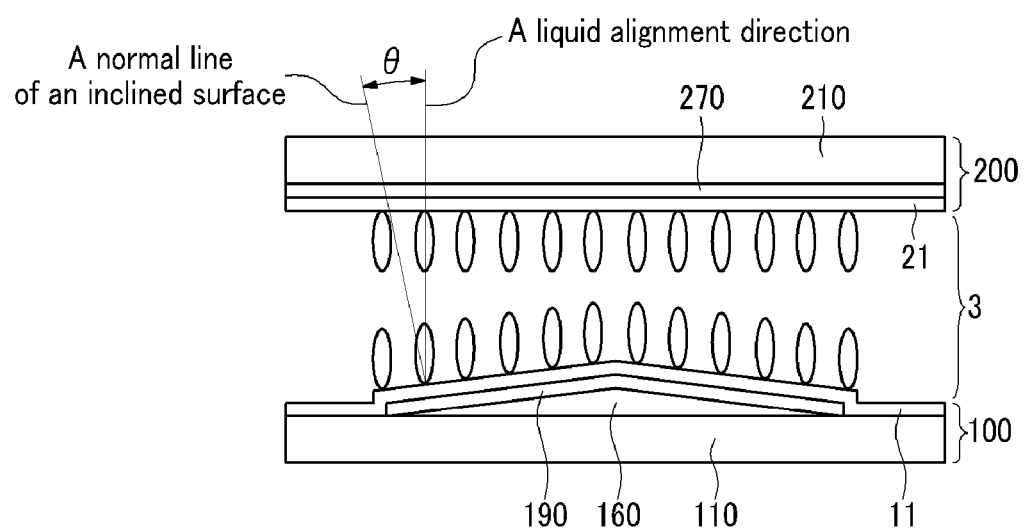
FIG. 5 shows the pre-tilt angle of the LC molecules in the LCD shown in FIG. 1 and FIG. 2.

In FIG. 5, the LC alignment direction is perpendicularly with respect to the substrates 110 and 210 and forms an angle θ with respect to the normal line of the inclined surface of the slope member 160. Here, the pixel electrode 190 is disposed on the slope member 160 such that it is formed according to the inclined surface of the slope member 160. Accordingly, when the electric field is applied between the pixel electrode 190 and the common electrode 270, the electric field lines are vertical with respect to the inclined surface near the pixel electrode 190. That is to say, the electric field lines are formed in the normal line direction of the inclined surface such that the LC molecules have the pre-tilt angle θ with respect to the electric field lines. In this way, the pre-tilt direction of the LC molecules may be determined under the application of a voltage, which may improve the response speed of the LC molecules, and a plurality of domains where the LC molecules are inclined uniformly may be formed, which may improve the viewing angle of the LCD. Here, the domains are divided by the ridges 161, 162, 163, and 164 and the valleys of the slope members 160.

On the other hand, in the absence of the application of the electric field between the pixel electrode 190 and the common electrode 270, the LC molecules are aligned perpendicularly with respect to the substrates 110 and 210 so that the polarization of light passing through the LC layer 3 is minimally influenced, if at all, by the LC molecules. Accordingly, in the case of the normally black mode LCD, the polarized light passing through the lower polarizer is blocked by the upper polarizer (analyzer), such that the black luminance becomes much lower.

Figure 6:
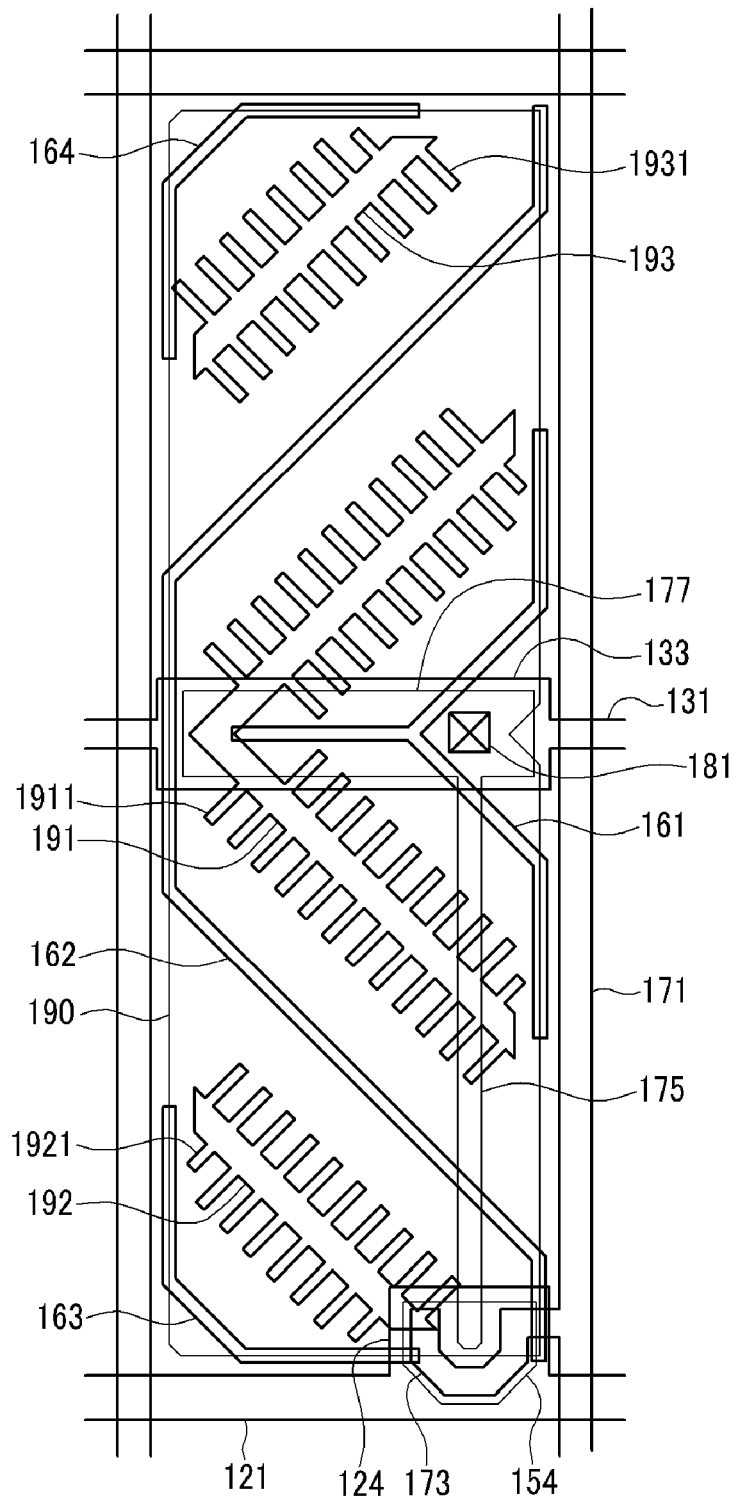
FIG. 6 is a layout view of an LCD according to another exemplary embodiment of the present invention.

FIG. 6 is a layout view of an LCD according to another exemplary embodiment of the present invention.

Most components of the LCD of FIG. 6 are the same as those of the LCD shown in FIG. 1 and FIG. 2, but each cutout 191, 192, and 193 has a plurality of minute slits 1911, 1921, and 1931. The minute slits 1911, 1921, and 1931 extend vertically with respect to the length direction of the cutouts 191, 192, and 193. The minute slits 1911, 1921, and 1931 form grooves on the surfaces of the alignment layers 11 and 21 such that the alignment force by which the LC molecules are inclined perpendicularly with respect to the cutouts 191, 192, and 193 may be enhanced under the application of the electric field.

FIG. 7, FIG. 8, FIG. 9, FIG. 10, and FIG. 11 are cross-sectional views of LCDs according to other exemplary embodiments of the present invention.

Figure 7:
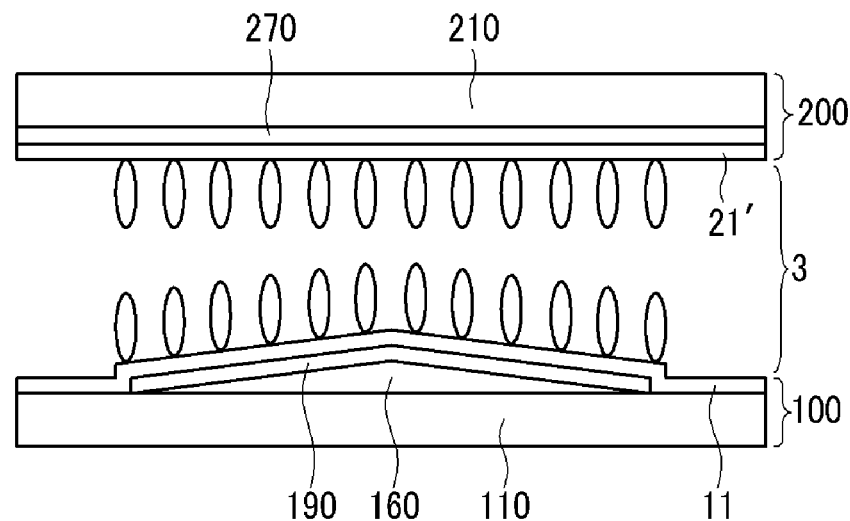
FIG. 7, FIG. 8, FIG. 9, FIG. 10A, FIG. 10B, and FIG. 11 are cross-sectional views of LCDs according to other exemplary embodiments of the present invention.

Firstly, the LCD of FIG. 7 includes an upper alignment layer 21' that may be made of polyimide and is a simple vertical alignment layer, as compared with those of the LCD of FIG. 1 and FIG. 2. The upper alignment layer 21' of FIG. 7 is aligned without light irradiation, and the LC molecules are aligned perpendicularly with respect to the substrate 210 through the characteristics of the polyimide. The alignment force may be weak as compared to that of an alignment layer that is aligned by light irradiation. However, additional light irradiation processes to align the upper alignment layer 21' may be omitted, thereby simplifying the manufacturing process of the LCD.

Figure 8:
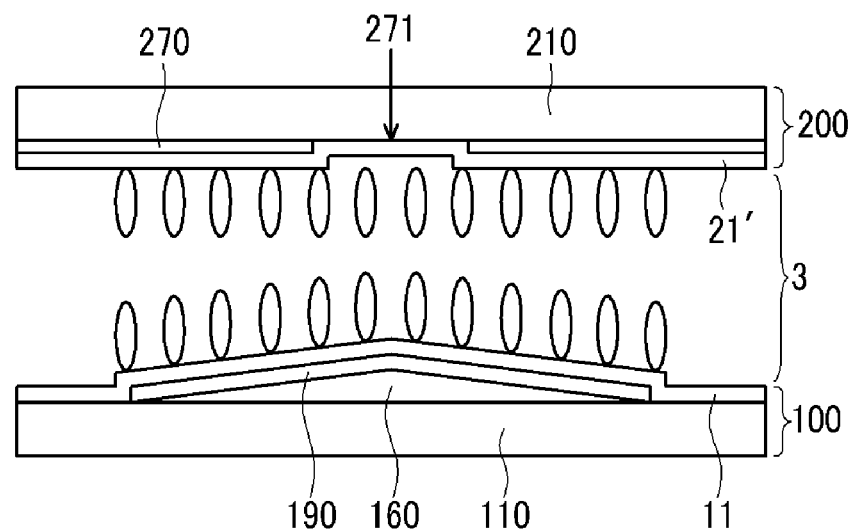

Next, the LCD of FIG. 8 includes a common electrode 270 including a cutout 271. The cutout 271 is formed according to the ridge of the slope member 160 at a position corresponding to the ridge. The cutout 271 provides a horizontal component to the electric field parallel to the substrate 210 so that LC molecules are uniformly aligned in each domain.

Figure 9:
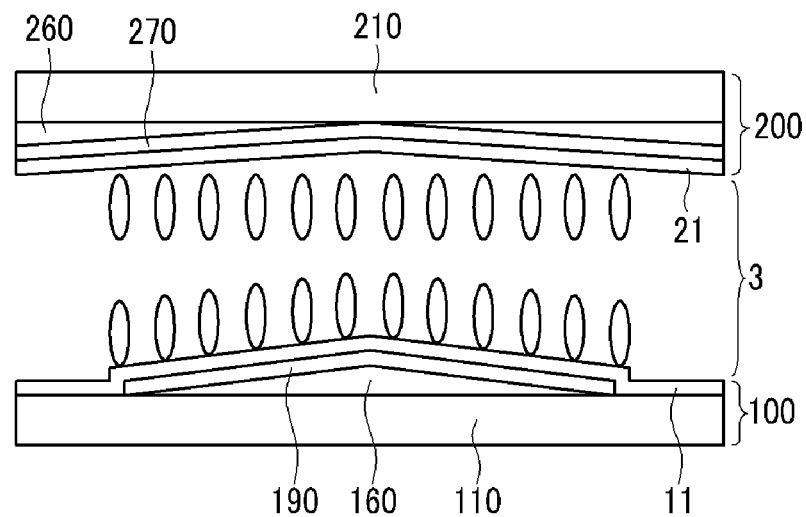

The LCD of FIG. 9 includes an upper substrate 210 having an upper slope member 260 forming a ridge. The upper slope member 260 has a ridge and the valley, and the ridge of the upper slope member 260 is disposed at a position corresponding to the valley of the lower slope member 160, and the valley of the upper slope member 260 is disposed at a position corresponding to the ridge of the lower slope member 160. In this way, when the upper slope member 260 having the ridge and the valley is formed, the LC molecules close to the upper alignment layer 21 are also pre-tilted with respect to the electric field lines such that the response speed of the LC molecules may be improved and the uniformity of the arrangement of the LC molecules in the LC domain may be improved.

Figure 10A:
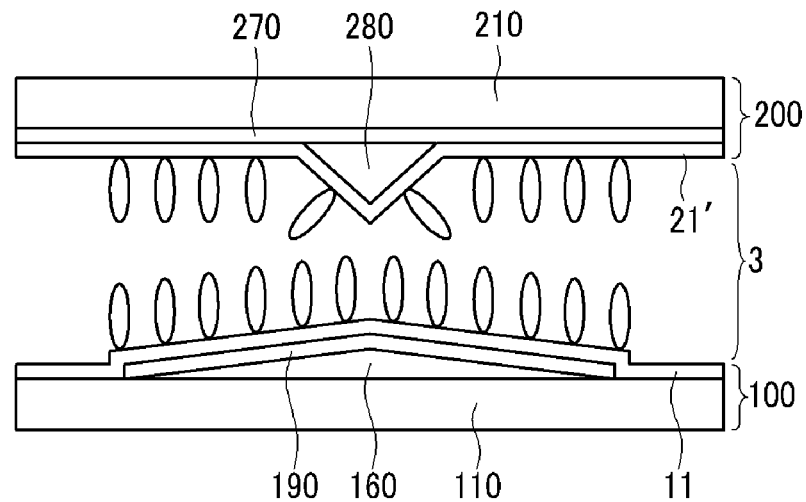
Figure 10B:
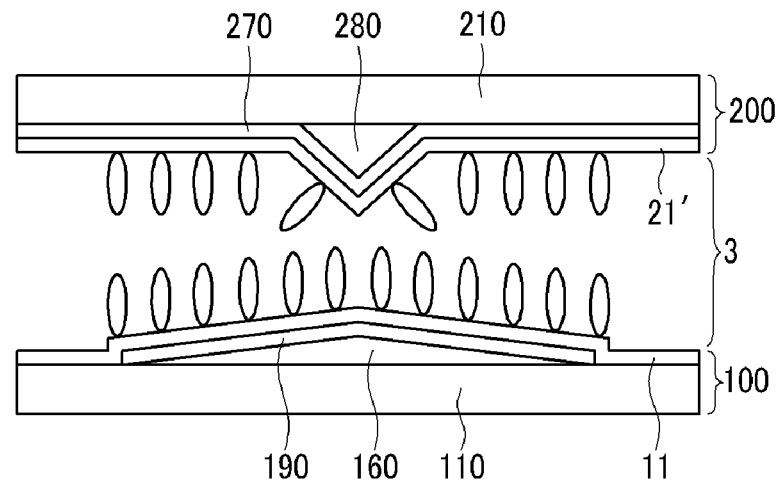

The LCD of FIG. 10A includes protrusions 280, which may be made of an organic material, on the common electrode 270, and the upper alignment layer 21' disposed on the protrusions 280. The upper alignment layer 21' may be a general vertical alignment layer made of polyimide. The protrusions 280 are arranged according to the ridge of the slope member 160 at a position corresponding to the ridge. Accordingly, the LC molecules near the protrusions 280 are perpendicularly aligned with respect to the inclined surface formed by the protrusions 280 such that they have the pre-tilt angle with respect to the common electrode 270. In this way, when the protrusions 280 are formed, the LC molecules near the protrusions 280 are pre-tilted with respect to the electric field lines under the application of the electric field such that the response speed of the LC molecules may be improved and the uniformity of the alignment of the LC molecules in the LC domain may be improved. As shown in FIG. 10B, the protrusions 280 may alternatively be disposed between the substrate 210 and the common electrode 270.

Figure 11:
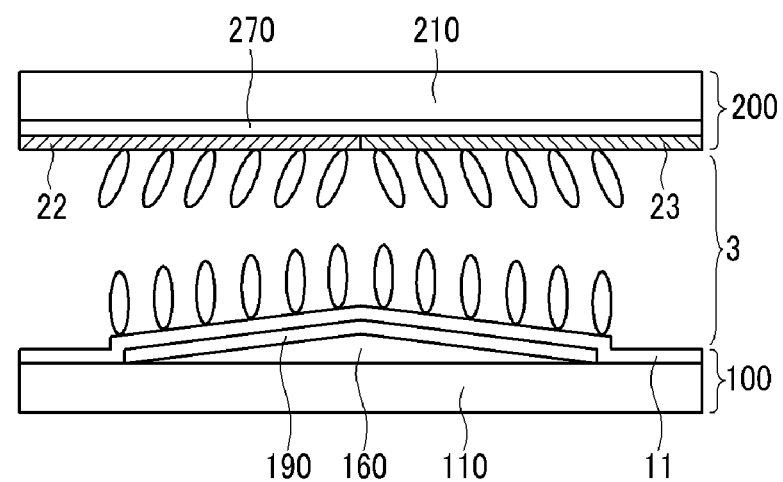

The LCD of FIG. 11 includes upper alignment layers 22 and 23 that are divided into a plurality of regions that are aligned in different directions through light irradiation. The upper alignment layers 22 and 23 are divided into respective domains, and are aligned through light irradiation such that the LC molecules are inclined toward the valley of the slope member 160 in each domain. Accordingly, referring to FIG. 11, the upper alignment layers 22 and 23 are aligned in four directions. Accordingly, when the upper alignment layers 22 and 23 are aligned with the different directions for each domain, the LC molecules near the upper alignment layers 22 and 23 are pre-tilted with respect to the electric field lines such that the response speed of the LC molecules may be improved and the uniformity of the alignment of the LC molecules in the LC domain may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a first signal line disposed on the first substrate;
a second signal line disposed on the first substrate and crossing the first signal line;
a switching element disposed on the first substrate, the switching element being connected to the first signal line and the second signal line;
a first slope member disposed on the switching element, the first slope member comprising a ridge, a valley, and an inclined surface between the ridge and the valley;
a pixel electrode disposed on the first slope member, the pixel electrode being connected to the switching element;
a first alignment layer disposed on the pixel electrode, the first alignment layer being vertically aligned with respect to a surface of the first substrate;
a second substrate facing the first substrate;
a common electrode disposed on the second substrate; and
a liquid crystal layer disposed between the first alignment layer and the common electrode,
wherein the inclined surface of the first slope member forms an angle in a range of 0.5 degrees to 5 degrees with a surface of the first substrate.

2. The liquid crystal display of claim 1, further comprising:
a second alignment layer disposed between the common electrode and the liquid crystal layer.

3. The liquid crystal display of claim 2, wherein:
the second alignment layer is a vertical alignment layer made of polyimide.

4. The liquid crystal display of claim 2, wherein:
the second alignment layer comprises a plurality of alignment regions with different alignment directions.

5. The liquid crystal display of claim 2, wherein:
the common electrode comprises at least one cutout.

6. The liquid crystal display of claim 5, wherein:
the at least one cutout is disposed at a position corresponding to the ridge of the first slope member.

7. The liquid crystal display of claim 2, further comprising:
a second slope member disposed between the second substrate and the common electrode.

8. The liquid crystal display of claim 7, wherein:
the ridge and the valley of the first slope member are respectively disposed at positions corresponding to a valley and a ridge of the second slope member.

9. The liquid crystal display of claim 2, further comprising:
an organic protrusion layer disposed between the common electrode and the second alignment layer.

10. The liquid crystal display of claim 9, wherein:
the organic protrusion layer is disposed at a position corresponding to the ridge of the first slope member.

11. The liquid crystal display of claim 2, further comprising:
an organic protrusion layer disposed between the common electrode and the second substrate.

12. The liquid crystal display of claim 11, wherein:
the organic protrusion layer is disposed at a position corresponding to the ridge of the first slope member.

13. The liquid crystal display of claim 2, wherein:
the second alignment layer is vertically aligned with respect to a surface of the second substrate.

14. The liquid crystal display of claim 13, wherein:
the pixel electrode comprises at least one cutout.

15. The liquid crystal display of claim 14, wherein:
the cutout is disposed on the position corresponding to the valley of the first slope member.

16. The liquid crystal display of claim 15, wherein:
the first slope member comprises a plurality of ridges, and the valley of the first slope member is disposed between two ridges of the first slope member.

17. The liquid crystal display of claim 16, wherein:
the first slope member comprises a first ridge, a second ridge, a third ridge, and a fourth ridge, wherein:
the first ridge comprises:
a stem parallel to the first signal line,
an upper oblique portion and a lower oblique portion extending upward and downward in oblique directions from the stem, respectively,
an upper branch extending upward from the upper oblique portion, parallel to the second signal line, and overlapping a right edge of the pixel electrode, and
a lower branch extending downward from the lower oblique portion, parallel to the second signal line, and overlapping the right edge of the pixel electrode;
the second ridge comprises:
a central portion overlapping a left edge of the pixel electrode,
an upper oblique portion and a lower oblique portion extending upward and downward in oblique directions from the central portion, respectively,
an upper branch extending upward from the upper oblique portion, parallel to the second signal line, and overlapping the right edge of the pixel electrode, and
a lower branch extending downward from the lower oblique portion, parallel to the second signal line, and overlapping the right edge of the pixel electrode;
the third ridge comprises:
an oblique portion disposed at the left lower corner of the pixel electrode and extending in the oblique direction,
a longitudinal branch extending upward from the oblique portion, parallel to the second signal line, and overlapping the left edge of the pixel electrode, and
a transverse branch extending in a right direction from the oblique portion, parallel to the first signal line, and overlapping a lower edge of the pixel electrode; and
the fourth ridge comprises:
an oblique portion disposed at the left upper corner of the pixel electrode and extending in the oblique direction,
a longitudinal branch extending downward from the oblique portion, parallel to the second signal line, and overlapping the left edge of the pixel electrode, and
a transverse branch extending in the right direction from the oblique portion, parallel to the first signal line, and overlapping an upper edge of the pixel electrode.

18. The liquid crystal display of claim 17, wherein:
the at least one cutout comprises a first cutout, a second cutout, and a third cutout;
the first cutout is disposed between the first ridge and the second ridge, the first cutout having a "V" shape; and
the second cutout and the third cutout are respectively disposed between the second ridge and the third ridge, and the second ridge and the fourth ridge, the second cutout and the third cutout having bar shapes extending in the oblique direction.

19. The liquid crystal display of claim 14, wherein:
the pixel electrode comprises a plurality of minute slits extending perpendicular to the length direction of the at least one cutout.

20. The liquid crystal display of claim 1, wherein:
the pixel electrode comprises at least one cutout.

21. The liquid crystal display of claim 20, wherein:
the at least one cutout is disposed at a position corresponding to the valley of the first slope member.

22. The liquid crystal display of claim 20, wherein:
the pixel electrode comprises minute slits perpendicular to the length direction of the at least one cutout.

23. A method for manufacturing a liquid crystal display, comprising:
forming a first display panel comprising a first substrate, a first slope member comprising a valley, a ridge, and an inclined surface between the valley and the ridge, a pixel electrode disposed on the first slope member, and a first alignment layer disposed on the pixel electrode;
forming a second display panel comprising a second substrate, a common electrode, and a second alignment layer disposed on the common electrode;
performing light irradiation to align the first alignment layer in a vertical direction with respect to the surface of the first substrate;
performing light irradiation to align the second alignment layer in the vertical direction with respect to the surface of the second substrate; and
combining the first display panel with the second display panel,
wherein the inclined surface of the first slope member forms an angle in a range of 0.5 degrees to 5 degrees with a surface of the first substrate.

24. The method of claim 23, wherein:
the light irradiation is performed with ultraviolet rays.

* * * * *